(12) United States Patent
Futakuchi et al.

(10) Patent No.: US 8,040,774 B2
(45) Date of Patent: Oct. 18, 2011

(54) OPTICAL DISK DEVICE AND TILT CORRECTION METHOD FOR OPTICAL DISK DEVICE

(75) Inventors: Ryutaro Futakuchi, Osaka (JP); Masahiro Birukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/677,184

(22) PCT Filed: Jul. 2, 2009

(86) PCT No.: PCT/JP2009/003072
§ 371 (c)(1),
(2), (4) Date: Mar. 9, 2010

(87) PCT Pub. No.: WO2010/004709
PCT Pub. Date: Jan. 14, 2010

(65) Prior Publication Data
US 2011/0002208 A1 Jan. 6, 2011

(30) Foreign Application Priority Data

Jul. 10, 2008 (JP) ................................. 2008-179826

(51) Int. Cl.
*G11B 7/00* (2006.01)
(52) U.S. Cl. ............... 369/53.19; 369/44.32; 369/44.41; 369/53.28; 369/13.33
(58) Field of Classification Search .................. None
See application file for complete search history.

(56) References Cited

U.S. PATENT DOCUMENTS

| 7,462,855 | B2 | 12/2008 | Saito et al. |
| 7,535,808 | B2 | 5/2009 | Ishimoto et al. |
| 2005/0180283 | A1 | 8/2005 | Ishimoto et al. |

(Continued)

FOREIGN PATENT DOCUMENTS

JP 2002-319160 10/2002

(Continued)

OTHER PUBLICATIONS

International Search Report issued Sep. 15, 2009 in International (PCT) Application No. PCT/JP2009/003072.

*Primary Examiner* — Jorge Ortiz Criado
(74) *Attorney, Agent, or Firm* — Wenderoth, Lind & Ponack, L.L.P.

(57) ABSTRACT

An optical disk device has: a detector (11) that converts a reflected light from an optical disk (5) and a reflected light of an incident light from a light source (1) side of a solid immersion lens (4), into electric signals and outputs the signals; a subtracter (15) that computes the output signal of the detector (11) according to a predetermined rule and outputs the result as a tilt detection signal; a CPU (21), an amplifier/phase compensation circuit (16), a switch (17) and an actuator (13) that perform tilt control for controlling tilt of the solid immersion lens (4) with respect to the optical disk (5) using the tilt detection signal; and the CPU (21), a nut (24), a feed screw (25), a decelerator (26) and a stepping motor (27) that perform gap adjustment for changing the gap of the solid immersion lens (4) and optical disk (5), and in the process of adjustment of gap between the solid immersion lens (4) and optical disk (5), the CPU (21) enables tilt control by closing the switch (17) according to the tilt detection signal.

7 Claims, 11 Drawing Sheets

U.S. PATENT DOCUMENTS

| | | | |
|---|---|---|---|
| 2005/0259530 A1* | 11/2005 | Ishimoto et al. | 369/53.19 |
| 2006/0255247 A1 | 11/2006 | Saito et al. | |
| 2009/0190453 A1* | 7/2009 | Lee et al. | 369/53.19 |
| 2010/0157756 A1* | 6/2010 | Ishimoto | 369/47.15 |
| 2010/0232264 A1* | 9/2010 | Narumi et al. | 369/44.14 |
| 2011/0007613 A1* | 1/2011 | Ito et al. | 369/44.11 |

FOREIGN PATENT DOCUMENTS

| | | |
|---|---|---|
| JP | 2005-259329 | 9/2005 |
| JP | 2006-344351 | 12/2006 |
| JP | 2008-146739 | 6/2008 |
| JP | 2008-305453 | 12/2008 |

* cited by examiner

FIG. 10

| GAP 9a (nm) | GAP 9b (nm) | PHOTOELECTRIC CONVERSION SIGNAL 12a | PHOTOELECTRIC CONVERSION SIGNAL 12b | TILT (°) | TILT DETECTION SIGNAL LEVEL |
|---|---|---|---|---|---|
| 30 | 170 | 0.481 | 0.872 | -0.2 | -0.391 |
| 40 | 160 | 0.531 | 0.859 | -0.172 | -0.328 |
| 50 | 150 | 0.575 | 0.844 | -0.143 | -0.269 |
| 60 | 140 | 0.616 | 0.827 | -0.115 | -0.211 |
| 70 | 130 | 0.652 | 0.809 | -0.086 | -0.157 |
| 80 | 120 | 0.685 | 0.789 | -0.057 | -0.104 |
| 90 | 110 | 0.715 | 0.767 | -0.029 | -0.052 |
| 100 | 100 | 0.742 | 0.742 | 0 | 0 |
| 110 | 90 | 0.767 | 0.715 | 0.029 | 0.052 |
| 120 | 80 | 0.789 | 0.685 | 0.057 | 0.104 |
| 130 | 70 | 0.809 | 0.652 | 0.086 | 0.157 |
| 140 | 60 | 0.827 | 0.616 | 0.115 | 0.211 |
| 150 | 50 | 0.844 | 0.575 | 0.143 | 0.269 |
| 160 | 40 | 0.859 | 0.531 | 0.172 | 0.328 |
| 170 | 30 | 0.872 | 0.481 | 0.2 | 0.391 |

OPTICAL DISK DEVICE AND TILT CORRECTION METHOD FOR OPTICAL DISK DEVICE

TECHNICAL FIELD

The present invention relates to an optical disk device that records signals on an optical disk, which is an optical recording medium, and/or reproduces signals from an optical disk, which is an optical recording medium, and a tilt correction method for this optical disk device.

BACKGROUND ART

As an approach to higher densities of optical disks, an optical disk device that uses an optical head, constituted by a condensing system that implements a high numerical aperture by combining an objective lens and a solid immersion lens (hereafter SIL), has been proposed.

In this system (hereafter SIL system), a high refractive index (about 1.8 to 2.0) material is used for the SIL and protective layer of the optical disk, and gap control is performed, so that information is recorded and reproduced using emission light from the SIL generated by bringing the gap between the SIL and protective layer of the optical disk to a micro value, around 25 nm.

FIG. 15 is a basic configuration of the optical system for recording and reproducing information to/from an optical disk using SIL.

In FIG. 15, 101 shows a light source, 103 shows an objective and 104 shows an SIL of which end face 108 has a circular shape, and a light beam 102 emitted from the light source 101 is condensed so that an appropriate spot size is obtained on the recording/reproducing surface 106 of an optical disk 105 by a condensing system comprised of the objective lens 103 and SIL 104.

At this time, a gap 109 between the surface 107 of the optical disk 105 and the end face 108 of the SIL 104 must be held to a micro value, around 25 nm by the above mentioned gap control.

The gap detection for this gap control is performed by converting the sum of the reflected light quantity from the end face 108 of the SIL 104 and the reflected light quantity from the recording/reproducing surface 106 of the optical disk 5, of the light beam 102 that enters the end face 108 of the SIL 104, into a gap detection signal 112 using a detector 111.

The beam splitter 110 is for allowing the reflected light from the end face 108 of the SIL 104 and the reflected light from the recording/reproducing surface 106 of the optical disk 105, of the light beam 102 that enter the end face 108 of the SIL 104, to enter the detector 111.

FIG. 16 is a graph on the relationship of the gap detection signal 112 and the gap 109, and shows characteristics of the incident light quantity (level of normalized gap detection signal 112) that enter the detector 111 with respect to the gap length (length of the gap 109).

In FIG. 16, the abscissa is the gap length (unit: nm) and the ordinate is the level of the gap detection signal 112 detected by the detector 111, that is normalized by the level of the gap detection signal 112 when the gap 109 is sufficiently large.

By performing an appropriate processing on the gap detection signal 112, such as comparing the gap detection signal 112 with an appropriate reference level and amplifying this difference, and driving the actuator 113 using this processing result, the gap 109 can be controlled to be maintained at a desired value.

For example, if the target value of the gap 109 is 25 nm, as mentioned above, the level of the gap detection signal 112 normalized in this case is 0.45 according to FIG. 16, therefore the reference level of the gap control is set to a value corresponding to 0.45.

In the above description, the example of using the actuator 113 only for gap control was used, but the actuator 113 can also be used for tracking control and/or tilt control depending on purpose. Patent Document 1 discloses an example of such gap control.

However the above mentioned gap 109 is extremely small, around 25 nm, so caution is required to avoid collision of the optical disk 105 and the SIL 104, and particularly when the optical disk 105 is relatively tilted with respect to the SIL 104, the possibility of this collision is expected to further increase.

FIG. 17 shows a state where the optical disk 105 is relatively tilted with respect to the condensing system comprised of the objective lens 103 and SIL 104 shown in FIG. 15, and a part of the end face 108 of the SIL 104 contacts the surface 107 of the optical disk 105.

In FIG. 17, if the distance between the center of the end face 108 of the SIL 104 and the surface 107 of the optical disk 105 is the gap 109, of which value is 25 nm, and the current diameter 131 of the end face 108 of the SIL 104 is 40 µm, then an angle formed by the end face 108 of the SIL 104 and the surface 107 of the optical disk 105, that is tilt 130 as an angle formed by the end face 108 of the SIL 104 and the recording/reproducing surface 106 of the optical disk 105 under the state shown in FIG. 17, is 0.07°. This means that the relative inclination of the SIL 104 and the optical disk 105, that is the tilt 130, must always be less than 0.07° so that the SIL 104 and the optical disk 105 do not collide.

The above indicates the necessity to establish tilt control, to make the tilt 130 less than 0.07° before establishing the above mentioned gap control.

Patent Document 2 discloses an example of the tilt control method to prevent the above mentioned problem, and this method includes a step of contacting the SIL with the optical disk in advance.

It is preferable that contact of an optical disk and SIL in an optical disk device, which may cause physical damage to each other, is avoided, and therefore the tilt control method according to Patent Document 2 may cause mutual damage to the SIL and optical disk.

Patent Document 1: Japanese Patent Application Laid-Open No. 2002-319160
Patent Document 2: Japanese Patent Application Laid-Open No. 2005-259329

DISCLOSURE OF THE INVENTION

It is an object of the present invention to provide an optical disk device that can accurately correct the tilt of a solid immersion lens without the solid immersion lens colliding with the optical disk, even if the value required for the gap of the optical disk and solid immersion lens is extremely small.

An optical disk device according to an aspect of the present invention comprises: an optical head that has a light source and a condensing system including a solid immersion lens; a plurality of photoelectric conversion units that convert a reflected light from an information recording/reproducing surface formed on an optical disk and a reflected light of an incident light from the light source side of the solid immersion lens, into electric signals, and output the signals; a tilt detection unit that outputs as tilt detection signals the result of computing the output signals of each of the plurality of photoelectric conversion units according to a predetermined rule;

a tilt control unit that performs tilt control for controlling the tilt of the solid immersion lens with respect to the optical disk, using the tilt detection signal from the tilt detection unit; and a gap adjustment unit that performs gap adjustment for changing the gap between the solid immersion lens and the optical disk, and the tilt control unit enables the tilt control according to the tilt detection signal that is output from the tilt detection unit in a process of adjusting the gap between the solid immersion lens and the optical disk by the gap adjustment unit.

By the above configuration, the tilt of a solid immersion lens can be accurately corrected without the solid immersion lens colliding with the optical disk, even if the value required for the gap of the optical disk and the solid immersion lens is extremely small.

BRIEF DESCRIPTION OF THE DRAWINGS

FIG. 10 is a table showing the relationship of the gap, photoelectric conversion signal level, tilt and tilt detection signal level.

BEST MODE FOR CARRYING OUT THE INVENTION

An embodiment of the present invention will now be described with reference to the drawings.

Figure 1:
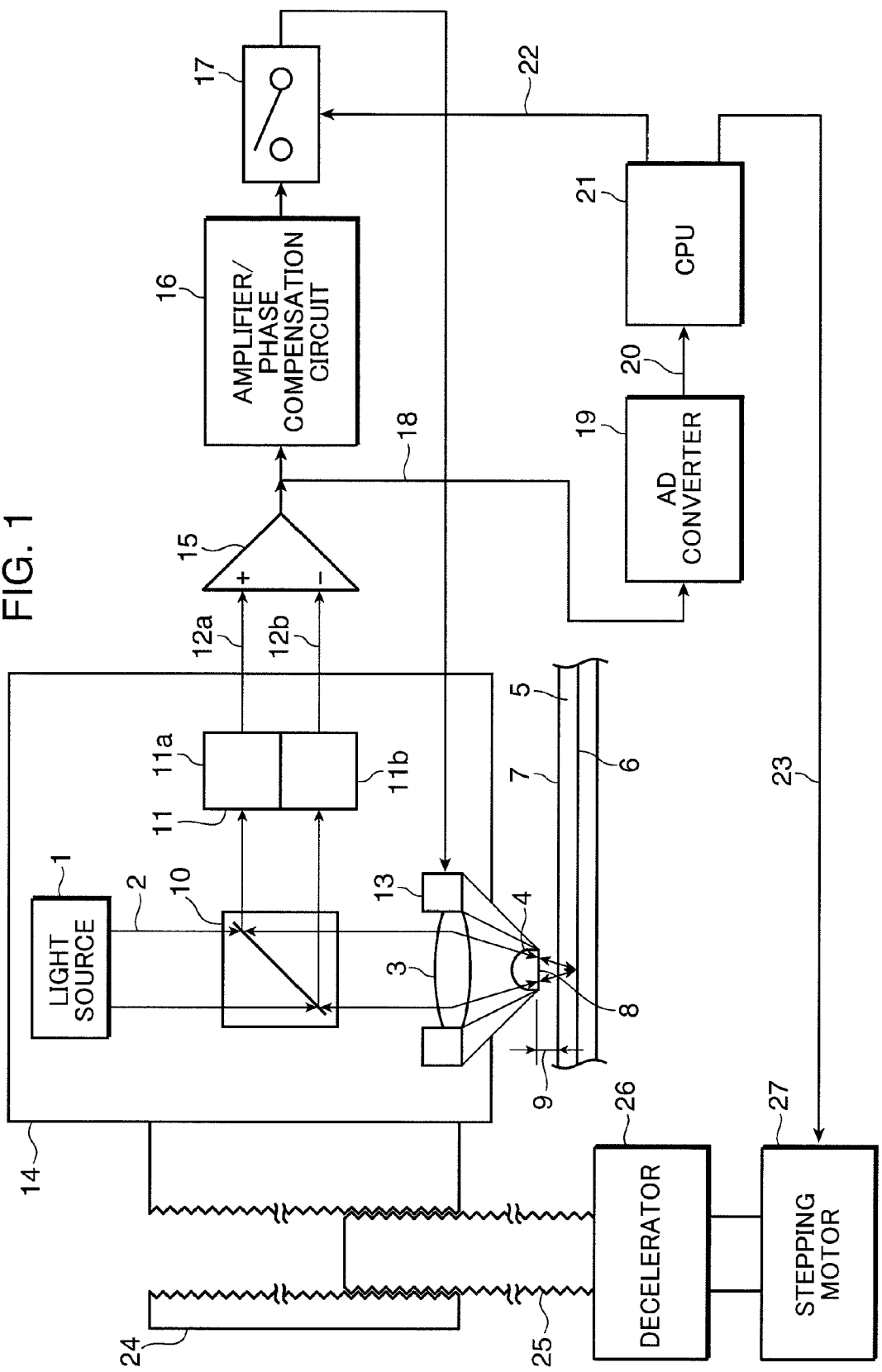
FIG. 1 is a diagram depicting a configuration of an optical disk device according to an embodiment of the present invention.

FIG. 1 is a diagram depicting a configuration of an optical disk device according to an embodiment of the present invention.

In FIG. 1, the optical disk device has an optical head 14, subtracter 15, amplifier/phase compensation circuit 16, switch 17, AD converter 19, CPU (Central Processing Unit) 21, nut 24, feed screw 25, decelerator 26 and stepping motor 27. The optical head 14 has a light source 1, objective lens 3, SIL 4, beam splitter 10, detector 11 and actuator 13.

The SIL 4 is a solid immersion lens of which shape of end face 8 is circular, and the light beam 2 emitted from the light source 1 are condensed by a condensing system comprised of the objective lens 3 and SIL 4, so as to have an appropriate spot size on a recording/reproducing surface (information recording/reproducing surface) 6 of the optical disk 5.

A gap 9 here is a gap between a surface 7 of the optical disk 5 and an end face 8 of the SIL 4, and must be maintained at a micro value around 25 nm by the gap control, so that normal recording/reproducing is performed on the optical disk 5.

The detector 11 is a two-division detector, which is constituted by a first detector 11a and a second detector 11b. To the detector 11, the sum of the reflected light from the end face 8 of the SIL 4, and the reflected light from the recording/reproducing surface 6 of the optical disk 5, of the light beam 2 that enter the end face 8 of the SIL 4, is entered, the first detector 11a and the second detector 11b convert the entered lights into the photoelectric conversion signals 12a and 12b, and the photoelectric conversion signals 12a and 12b are output respectively.

The beam splitter 10 is for allowing the reflected light from the end face 8 of the SIL 4 and the reflected light from the recording/reproducing surface 6 of the optical disk 5, of the light beam 2 that enter the end face 8 of the SIL 4, to enter into the first detector 11a and the second detector 11b.

The photoelectric conversion signals 12a and 12b are input to the plus input and minus input of the subtracter 15, and the subtracter 15 outputs the result of subtracting the photoelectric conversion signal 12b from the photoelectric conversion signal 12a to the amplifier/phase compensation circuit 16 and AD converter 19 as the tilt detection signal 18. The output signal of the subtracter 15 becomes the detection signal on the relative tilt of the optical disk 5 and SIL 4, that is a tilt detection signal 18.

Therefore the two-division detector 11, that is the first detector 11a and the second detector 11b, constitutes an example of the plurality of photoelectric conversion units, and the subtracter 15 constitutes an example of the tilt detection unit. The reason why the output signal of the subtracter 15 becomes the tilt detection signal 18 will be described later.

The light source 1, objective lens 3, SIL 4, beam splitter 10 and first and second detectors 11a and 11b are composing elements of the optical head according to the present embodiment, and in FIG. 1, the optical head is denoted by 14.

The tilt detection signal 18 is appropriately processed by the amplifier/phase compensation circuit 16, and the amplifier/phase compensation circuit 16 drives the actuator 13 via the switch 17. If the switch 17 is closed, the tilt control is established, that is tilt control is enabled, and the relative tilt of the optical disk 5 and SIL 4 is corrected (tilt correction).

The tilt detection signal 18 is input to the AD converter 19, and is converted into a digitized tilt detection signal 20 (digital data that indicates the relative tilt of the optical disk 5 and SIL 4, that is equivalent to the tilt detection signal 18) by the AD converter 19, and is input to the CPU 21. The CPU 21 monitors the state of the digitized tilt detection signal 20, and is programmed in advance such that if this state satisfies a predetermined condition, a switching instruction 22 of the above mentioned switch 17 is switched to an instruction to indicate "close" state, and this state is maintained.

The condition on the tilt detection signal 18, that is the digitized tilt detection signal 20, by which the CPU 21 sets the switching instruction 22 of the switch 17 to the "close" state, will be described later.

The CPU 21, amplifier/phase compensation circuit 16, switch 17 and actuator 13 constitute an example of a tilt control unit.

According to the present embodiment, the actuator 13 is limited to use for tilt control, therefore an actuator for gap control, that is used for controlling the gap constant and/or an actuator for tracking control, that is for tracking the optical beam on a desired track, are needed, so a description on these actuators, which are based on a known technology and are not directly related to the present invention, is omitted. If the actuator 13 can be used not only for tilt control but also for gap control and/or tracking control as well, the actuator 13 can be shared for these purposes.

The nut 24 is integrated with the above mentioned optical head 14, and is engaged with the feed screw 25. The pitch of the feed screw 25 of the present embodiment is 0.1 mm, and the pitch of the nut 24 is therefore also 0.1 mm.

When the feed screw 25 rotates once, the optical head 14 moves either closer to or away from the optical disk 5, that is, the gap 9 either decreases or increases, depending on the rotation direction of the feed screw 25.

The feed screw 25 is also connected to the decelerator 26, that has a speed reducing ratio of 1/20000, and the decelerator 26 is driven by the stepping motor 27. This means that the increase/decrease of the gap 9, when the stepping motor 27 rotates once, is 5 nm. The rotation instruction pulse 23 of the stepping motor 27 is transmitted from the CPU 21.

The CPU 21, nut 24, feed screw 25, decelerator 26 and stepping motor 27 constitute an example of the gap adjustment unit for adjusting the length of the gap 9.

In the present embodiment, a predetermined amount that the gap adjustment unit decreases or increases the gap 9 in each step is about 10 nm, which is equivalent to two rotations of the stepping motor 27.

The operation of the present embodiment having the above configuration will now be described, including the tilt correction method for this optical disk device.

Figure 2:
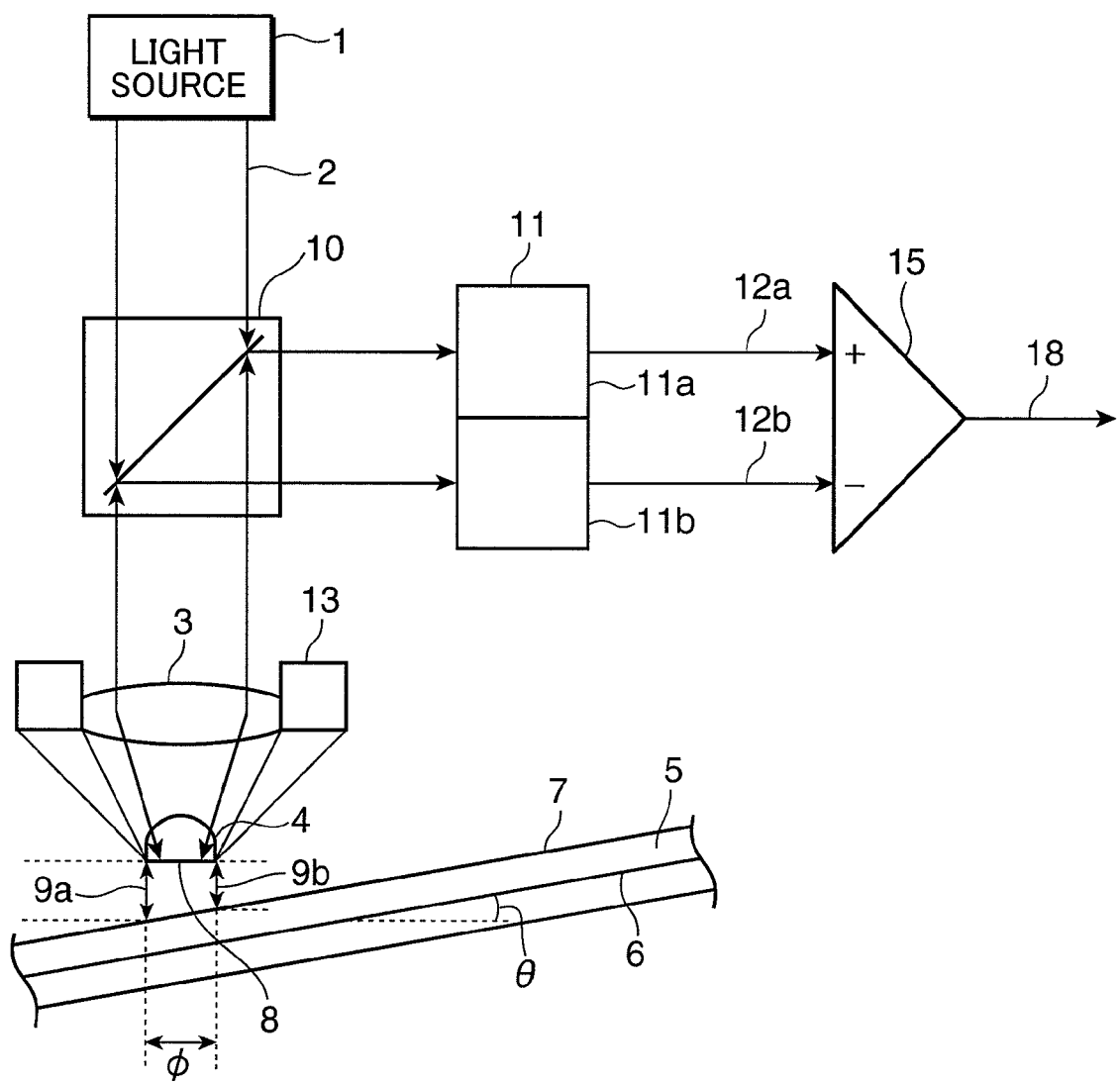
FIG. 2 is a diagram depicting an optical system when SIL is tilted with respect to an optical disk.

First it is assumed that the optical disk 5 is tilted with respect to the SIL 4, as shown in FIG. 2. Then the gap between the surface 7 of the optical disk 5 and the SIL 4 becomes uneven at the left and right of the SIL 4 on the page face, as the gaps 9a and 9b (gap 9a>gap 9b) shown in FIG. 2, and incident light quantity distribution appears in the detector 11 since the gap length depends on the incident light quantity to the detector 11, as described in the section on background art.

If a detector having a two-division configuration is used as the detector 11, and the relative tilt relationship of the SIL 4 and optical disk 5 is as shown in FIG. 2, and if the respective portions of the detector 11 are the first and second detectors 11a and 11b, then the light quantity that enters the light receiving portion of the first detector 11a is a light quantity that depends on the portion of the gap 9a shown in FIG. 2, and the light quantity that enters the light receiving portion of the second detector 11b is a light quantity that depends on the portion of the gap 9b, and therefore the incident light quantity to the first detector 11a is greater than the incident light quantity to the second detector 11b.

Figure 3:
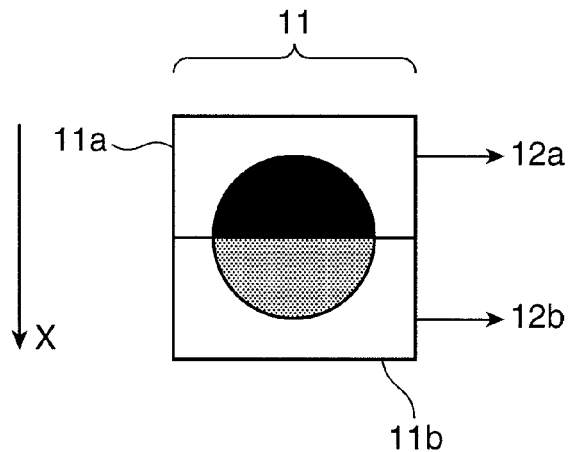
FIG. 3 is a diagram depicting an example of incident light quantity distribution on the detector shown in FIG. 1.
Figure 4:
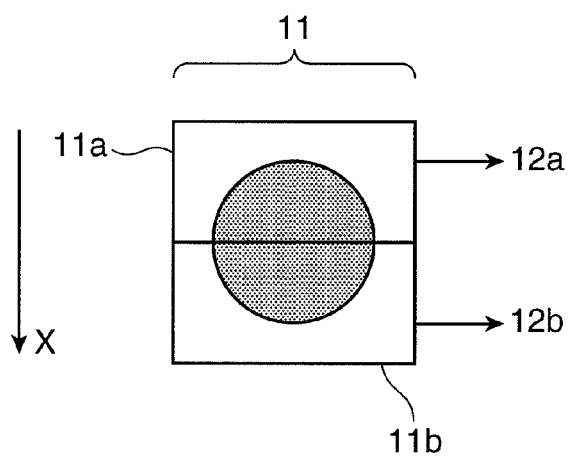
FIG. 4 is a diagram depicting another example of incident light quantity distribution on the detector shown in FIG. 1.
Figure 5:
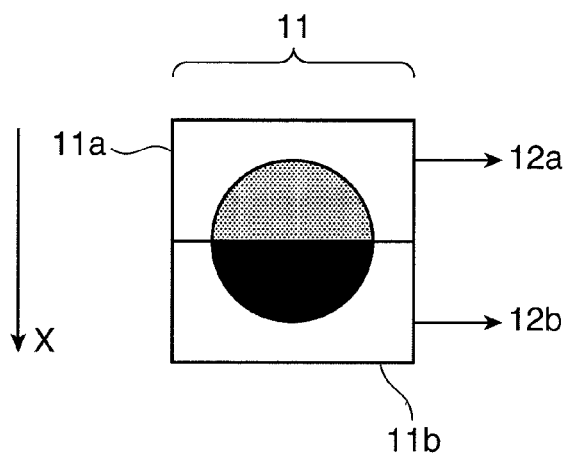
FIG. 5 is a diagram depicting another example of incident light quantity distribution on the detector shown in FIG. 1.
Figure 6:
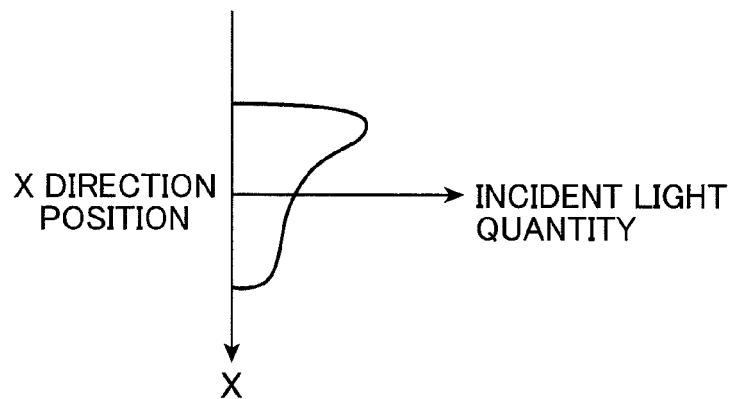
FIG. 6 is a graph depicting actual incident light quantity distribution in the case of FIG. 3.
Figure 7:
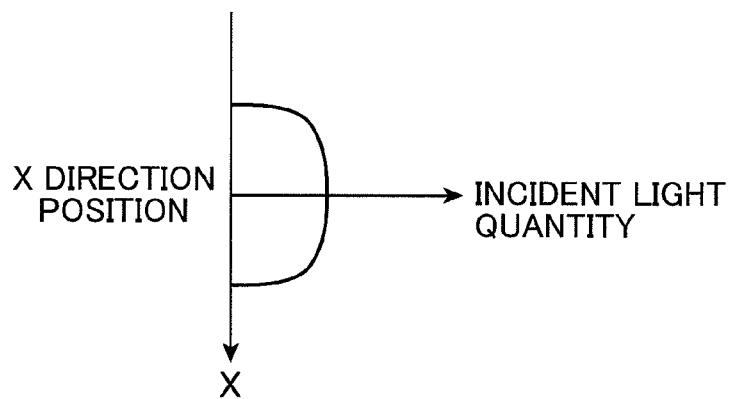
FIG. 7 is a graph depicting actual incident light quantity distribution in the case of FIG. 4.
Figure 8:
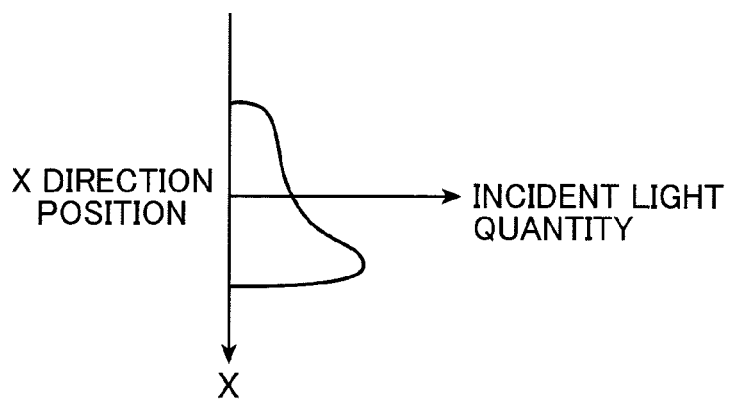
FIG. 8 is a graph depicting actual incident light quantity distribution in the case of FIG. 5.

FIG. 3 to FIG. 5 are diagrams depicting the difference between the incident light quantity distributions on the first and second detectors 11a and 11b, and FIG. 6 and FIG. 8 are graphs depicting the actual incident light quantity distributions in the case of FIG. 3 to FIG. 5. The ordinates of FIG. 6 to FIG. 8 indicate a scale the same as the X direction in FIG. 3 to FIG. 5 (X direction position), and the abscissas in FIG. 6 to FIG. 8 indicate the incident light quantity.

In FIG. 3, the dark shaded portion on the first detector 11a indicates the incident light quantity that depends on the gap 9a shown in FIG. 2, and the light shaded portion on the second detector 11b indicates the incident light quantity that depends on the gap 9b.

The actual incident light distribution in this state is graphed in FIG. 6. The top portion above the abscissa in FIG. 6 shows the incident light quantity distribution to the first detector 11a, and the bottom portion shows the incident light quantity distribution to the second detector 11b, and the magnitude relationship of the photoelectric conversion signals 12a and 12b, which are the output signals of the first and second detectors 11a and 11b, is (signal level of photoelectric conversion signal 12a)>(signal level of photoelectric conversion signal 12b), which corresponds to the length relationship of (gap 9a)>(gap 9b).

Needless to say, if (signal level of the photoelectric conversion signal 12a)>>(signal level of photoelectric conversion signal 12b), then the length relationship is (gap 9a)>> (gap 9b).

If SIL 4 is not tilted with respect to the optical disk 5 (in other words (gap 9a)=(gap 9b)), then the difference of the incident light quantity distributions of the first and second detectors 11a and 11b is as shown in FIG. 4, where the degree of the shade to indicate intensity is the same for both detectors, and as the graph on incident light quantity distribution in FIG. 7 shows, the incident light quantity distribution to the first detector 11a in the top portion above the abscissa and the incident light quantity distribution to the second detector 11b in the bottom portion are the same.

Therefore the magnitude relationship of the photoelectric conversion signals 12a and 12b, which are the output signals of the first and second detectors 11a and 11b is (signal level of photoelectric conversion signal 12a)=(signal level of photoelectric conversion signal 12b).

If the tilting state of the SIL 4 with respect to the optical disk 5 is the opposite of FIG. 2, that is (gap 9a)<(gap 9b), then the difference between the incident light quantity distribution to the first and second detectors 11a and 11b is as shown in FIG. 5, where the light shaded portion on the first detector 11a indicates the incident light quantity that depends on the gap 9a, and the dark shaded portion on the second detector 11b indicates the incident light quantity that depends on the gap 9b.

Therefore in the incident light quantity distribution in this case, as the graph in FIG. 8 shows, the relationship of the incident light quantity distribution to the first detector 11a and the incident light quantity distribution to the second detector 11b, with respect to the abscissa as the boundary, is the opposite of FIG. 6.

As described above, the relative tilt of the optical disk 5 and SIL 4 (angle formed by the end face 8 of the SIL 4 and the surface 7 of the optical disks 5), that is the tilt angle θ formed by the end face 8 of the SIL 4 and the recording/reproducing surface 6 of the optical disk 5 can be detected by the level difference of the photoelectric conversion signals 12a and 12b of the first and second detectors 11a and 11b, hence the output signal of the subtracter 15 in FIG. 1 can be the tilt detection signal.

The sum of the photoelectric conversion signals 12a and 12b of the first and second detectors 11a and 11b becomes the gap detection signal.

Therefore in order to establish the gap control, the sum signal of the photoelectric conversion signals 12a and 12b is used as the gap detection signal.

Now the condition on the tilt detection signal 18 for the CPU 21 to set the switching instruction 22 of the switch 17 to "close" will be described.

Figure 9:
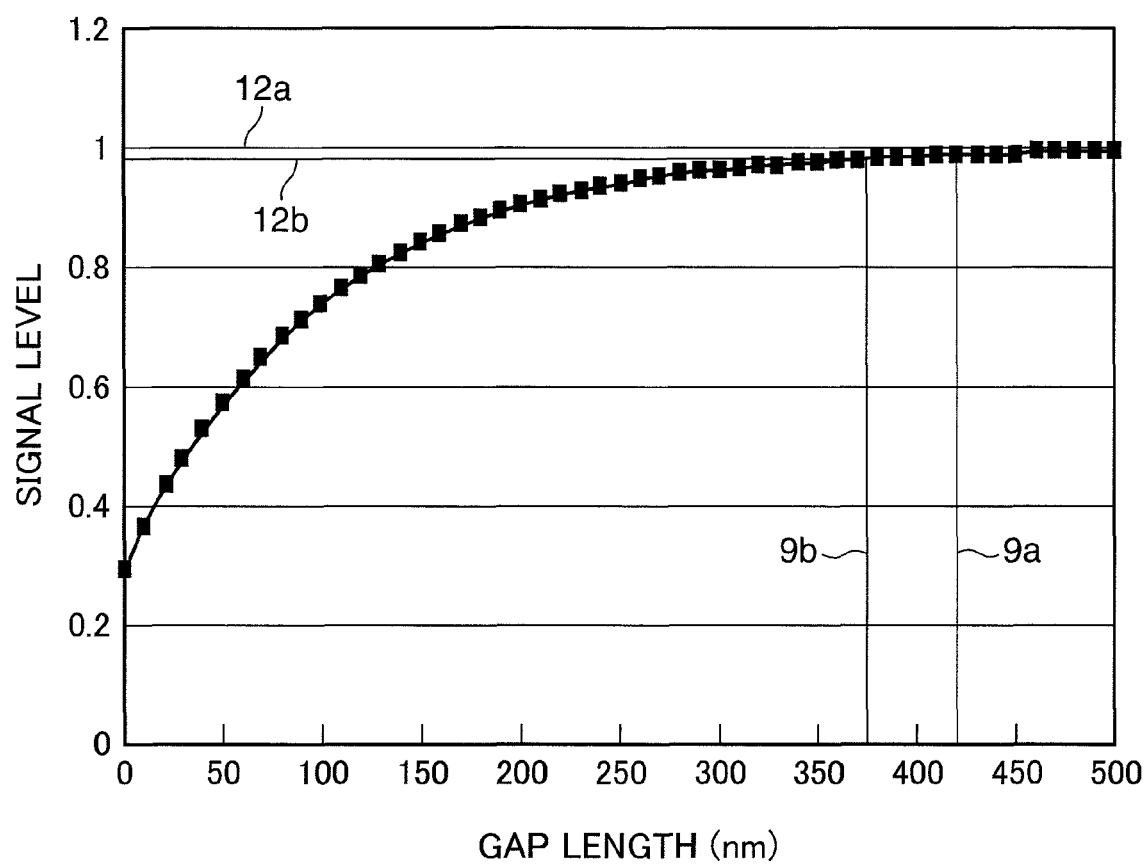
FIG. 9 is a graph depicting the relationship of the gap length and photoelectric conversion signal level.
Figure 16:
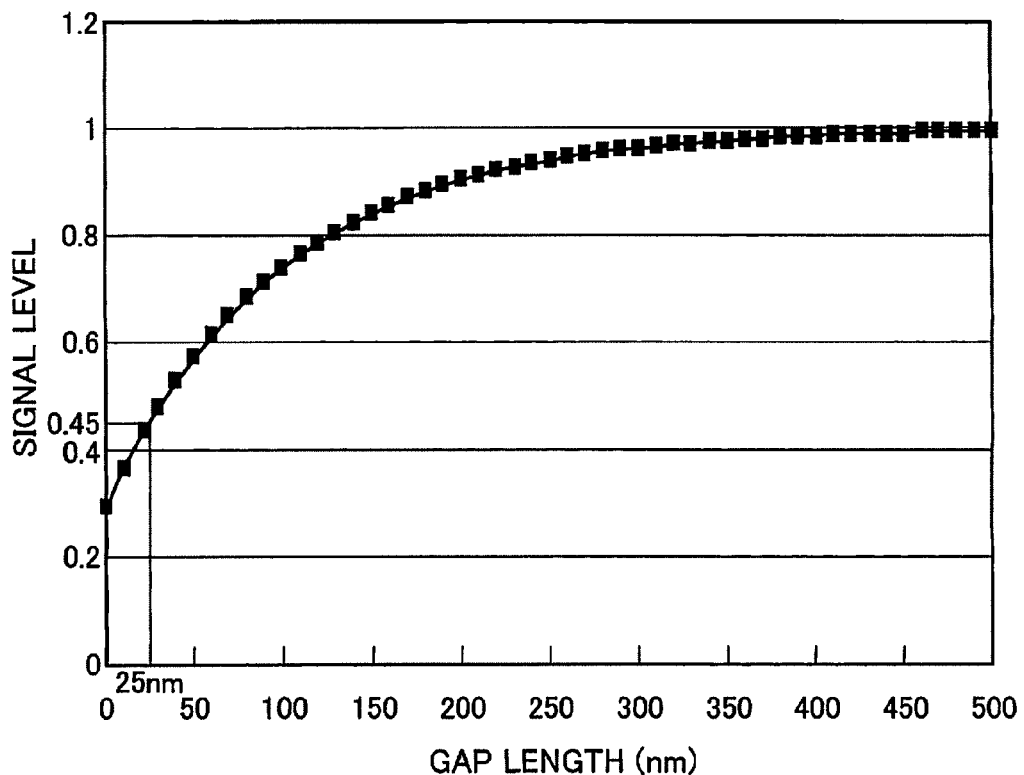
FIG. 16 is a graph depicting a relationship of the gap length and the gap detection signal level.
Figure 17:
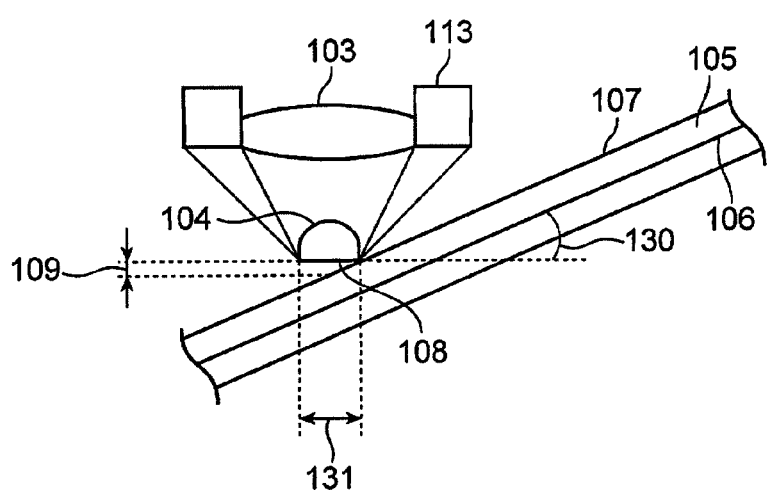
FIG. 17 is a diagram depicting a state of the optical disk that is tilted with respect to the condensing system comprised of an SIL and an objective lens.

FIG. 9 is a graph equivalent to that in FIG. 16 which was used for describing the background art, where the ordinate is a level of the photoelectric conversion signal 12a or the photoelectric conversion signal 12b when the gap 9a and gap 9b are sufficiently long, and shows a value when the value of the level of the photoelectric conversion signal 12a detected by the first detector 11a or the value of the level of the photoelectric conversion signal 12b detected by the second detector 11b, is normalized.

As FIG. 9 shows, for both gap 9a and gap 9b, in an area of which gap length is long, exceeding 350 nm, the difference of the levels of the photoelectric conversion signals 12a and 12b of the first and second detectors 11a and 11b (detected values normalized by a value when the gap 9a and gap 9b are sufficiently long) is approximately "0", even if the difference of the gap 9a and gap 9b is large, about 50 nm, that is the relative tilt of the optical disk 5 and SIL 4 (tilt) is large, and the level of the tilt detection signal 18, which is a difference signal of the photoelectric conversion signals 12a and 12b, is also approximately "0", hence tilt is not detected, which is an anomaly.

Therefore according to the present embodiment, the CPU 21 stores a program which inputs the digitized tilt detection signal 20, converted from the tilt detection signal 18 by the AD converter 19, to the CPU 21, whereby the level of the tilt detection signal 18 is monitored and the switching instruction 22 of the switch 17, shown in FIG. 1, is maintained in a "close" state, that is the tilt control is enabled when the absolute value exceeds a predetermined level, and the CPU 21 operates according to this program.

In other words, the absolute value of the level of the tilt detection signal 18, exceeding a predetermined level means that tilt was detected with certainty, and therefore according to the present embodiment, the CPU 21 enables tilt control in a state where the relative tilt of the optical disk 5 and SIL 4 (tilt) was detected with certainty, hence tilt can be accurately corrected.

According to the study of the present inventors, the level of the absolute value of the tilt detection signal 18 to maintain the switching instruction 22 of the switch 17 shown in FIG. 1, that is to enable the tilt control, is 0.05 to 0.1.

The level of the absolute value of the tilt detection signal 18 is a value when the detected value is normalized by a value of a level of the photoelectric conversion signal 12a or photoelectric conversion signal 12b when the gap 9a and gap 9b are sufficiently long, and this level of the absolute value of the tilt detection signal 18 can be determined by measuring the level of the photoelectric conversion signal 12a or photoelectric conversion signal 12b when the gap 9a and gap 9b are sufficiently long in advance, storing the measured value in the CPU 21 as the normalization reference value, and dividing the digitized tilt detection signal 20, converted by the AD converter 19, by the normalization reference value, and performing the coding processing to determine the absolute value of the division result.

Figure 11:
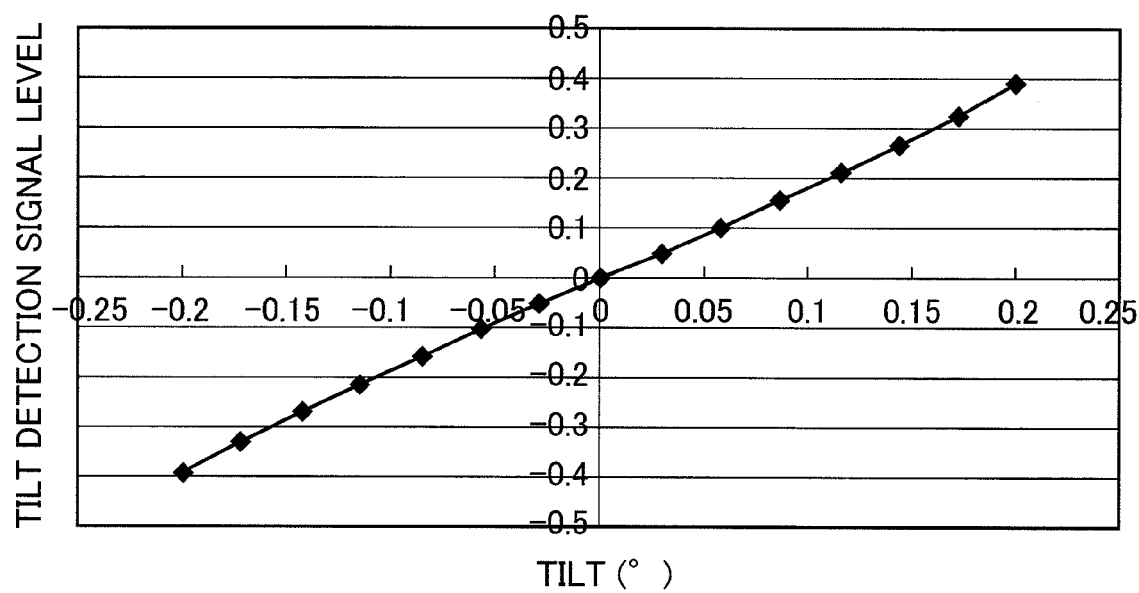
FIG. 11 is a graph depicting the relationship of tilt and the tilt detection signal level.

Now an example of the tilt detection sensitivity, that is a relationship of the tilt θ and the level of the tilt detection signal 18 will be described. For example, when the average value of the gap 9a and gap 9b in FIG. 2 is 100 nm, the diameter φ of the SIL 4 is 40 μm, FIG. 10 shows a table of: the length (nm) of the gap 9a and gap 9b when the tilt of the SIL 4 with respect to the optical disk 5 is changed, with this average value (100 nm) at the center; the levels of the photoelectric conversion signals 12a and 12b which are read from the characteristics in FIG. 9; the tilt θ (°) which is determined by arctran (((gap 9a)−(gap 9b))/φ); and the level of the tilt detection signal 18 that is an output signal of the subtracter 15. FIG. 11 is a graph depicting a relationship of the tilt θ and the level of the tilt detection signal 18, based on FIG. 10.

According to FIG. 11, the level of the tilt detection signal 18 with respect to the tilt θ changes approximately linearly, which shows that tilt control can be established if the tilt control signal is generated by inputting the tilt detection signal 18 into the amplifier/phase compensation circuit 16, and processing the signal, and the actuator 13 is driven via the switch 17 using this tilt control signal.

Figure 12:
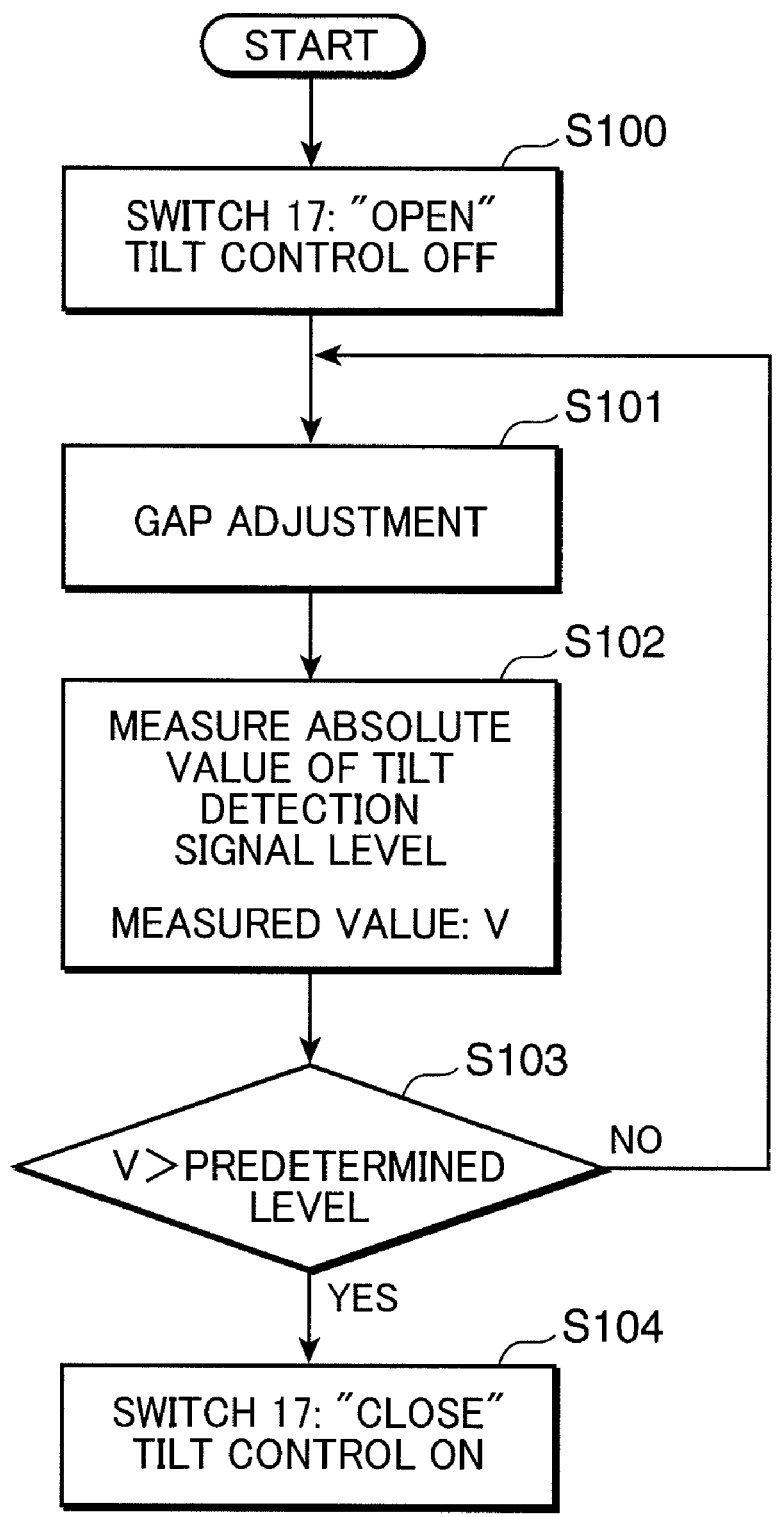
FIG. 12 is a flow chart depicting a tilt correction method in the optical disk device shown in FIG. 1.

Now the tilt correction method for the optical disk device according to the present embodiment will be described. FIG. 12 is a flow chart depicting the tilt correction method for the optical disk device according to the present embodiment.

In FIG. 12, the CPU 21 shown in FIG. 1 executes tilt control OFF processing S100 to set the state of the switching instruction 22 of the switch 17 to "open". In concrete terms, in step S100, the CPU 21 outputs the switching instruction 22 to instruct "open" state to the switch 17, so that the switch 17 becomes "open" state, and tilt control is turned OFF.

At this time, it is assumed that the values of the gap 9a and gap 9b, generated by the relative tilt of the SIL 4 and optical disk 5, are sufficiently large, exceeding 500 nm.

Then the gap adjustment processing S101 is executed, that is, the above mentioned gap adjustment unit constituted by the nut 24, feed screw 25, decelerator 26 and stepping motor 27 is activated so that SIL 4 is moved in the direction of decreasing the gap 9a and gap 9b. In concrete terms, in step S101, the CPU 21 outputs the rotation instruction pulse 23, for rotating the stepping motor 27 for a predetermined step, to the stepping motor 27 as a gap adjustment for one time, then the stepping motor 27 rotates for predetermined steps, the decelerator 26 converts the rotation angle of the stepping motor 27 into a micro-rotation angle according to the speed reducing ratio, and the feed screw 25 is driven by the micro rotation angle after conversion, whereby the nut 24 is moved to the optical disk 5 side. As a result, the SIL 4 is moved in a direction to decrease the gap 9a and gap 9b.

According to the present embodiment, the gap adjustment value for one time is 10 nm. Therefore a number of pulses of the rotation instruction pulse 23 to be supplied to the stepping motor 27 by the CPU 21 is a number corresponding to this 10 nm. As a result, the SIL 4 moves closer to the optical disk 5 by 10 nm at a time in each gap adjustment, from the initial position where the gap 9a and gap 9b exceed 500 nm.

Then the absolute value level of the tilt detection signal 18, shown in FIG. 1, is measured, and the measurement processing S102, for storing the measured value V in the internal memory of the CPU 21, is executed. In concrete terms, in step S102, after gap adjustment processing for one time in step S101 ends, the subtracter 15 subtracts the photoelectric conversion signal 12b from the photoelectric conversion signal 12a, and outputs the result to the AD converter 19 as the tilt detection signal 18, the AD converter 19 converts the tilt detection signal 18 into the digitized tilt detection signal 20, and the CPU 21 stores the absolute value of the digitized tilt detection signal 20 in the internal memory as the measured value V.

Then the evaluation processing S103, for evaluating whether the measured value V is greater than a predetermined level, is performed, and if the evaluation result is NO, processing returns to the gap adjustment processing S101, and the measurement processing S102 and evaluation processing S103 are repeated. In concrete terms, in step S103, the CPU 21 compares the measured value V stored in step S102 and a predetermined reference level Vref, which is stored in the internal memory in advance, and if the measured value V is greater than the reference level Vref, processing advances to step S104, and if the measured value V is not greater than the reference level Vref, processing returns to step S101 and subsequent processing is continued so that SIL 4 moves closer to the optical disk 5 by 10 nm at a time.

If the evaluation result in the evaluation processing S103 is satisfactory (measured value V is greater than the predetermined level), this means that tilt was detected with certainty, as mentioned above, so the tilt control ON processing S104 is executed to set the state of the switching instruction 22 of the switch 17 to "close" state, and a series of tilt corrections complete, that is the tilt of SIL 4 with respect to the optical disk 5, is corrected. In concrete terms, if it is judged that the measured value V is greater than the reference level Vref in step S103, the CPU 21 switches the switching instruction 22 from an instruction to set the "open" state to an instruction to set the "close" state in step S104, whereby the switch 17 becomes the "close" state, tilt control is turned ON, and the actuator 13 corrects the tilt of the SIL 4 with respect to the optical disk 5.

In the present embodiment, the above mentioned predetermined level (reference level Vref) is a value in the 0.05 to 0.1 range, for example, and if the measured value V exceeds this value, the tilt control is turned ON. According to the present embodiment, the tilt control is turned ON when the measured value V exceeds a predetermined level, but the tilt control may be turned ON when the measured value V reaches a predetermined level or more, and these are substantially the same.

Needless to say, the above mentioned processings S100 to S104 are programmed in the CPU 21 in advance. In the above mentioned method, the tilt detection signal 18 is measured once each time SIL 4 is moved closer to the optical disk 5, but the present invention is not limited to this example, and the tilt detection signal 18 may be measured a plurality of times at a same location each time SIL 4 is moved closer to the optical disk 5, so that the tilt control is enabled when an evaluation result is satisfactory for a predetermined number of times or more, or for all measurement values.

In a normal condition, the relative tilt of the optical disk 5 and SIL 4 is generated, so the above mentioned processing is based on the assumption that the relative tilt of the optical disk 5 and SIL 4 exists, but it is possible that the relative tilt of the optical disk 5 and SIL 4 does not exist, or is hardly generated. Therefore an adder for adding the photoelectric conversion signals 12a and 12b of the first and second detectors 11a and 11b, and an AD converter for converting the gap detection signal that is output from the adder into the digitized gap detection signal, may be added so that the digitized gap detection signal is input to the CPU 21.

In this case, if it is judged that the measured value V is not greater than the reference level Vref in S103, the CPU 21 may further judge whether the gap indicated by the digitized gap detection signal is smaller than a predetermined value, so that only when the gap indicated by the digitized gap detection signal is the predetermined value or more, processing moves to step S101 and subsequent processing is continued, and if the digitized gap detection signal is smaller than the predetermined value, the gap control, to keep the gap constant, is performed. At this time, the tilt control may be performed when necessary.

In this case, even if a relative tilt of the optical disk 5 and SIL 4 is not generated or hardly generated, gap control can be performed with certainty, without causing a collision of the optical disk 5 and SIL 4, and the tilt control can be performed when necessary.

A method for performing the processing to evaluate the measured value of the absolute value level of the tilt detection signal 18 for a predetermined number of continuously measured values is also effective.

Figure 13:
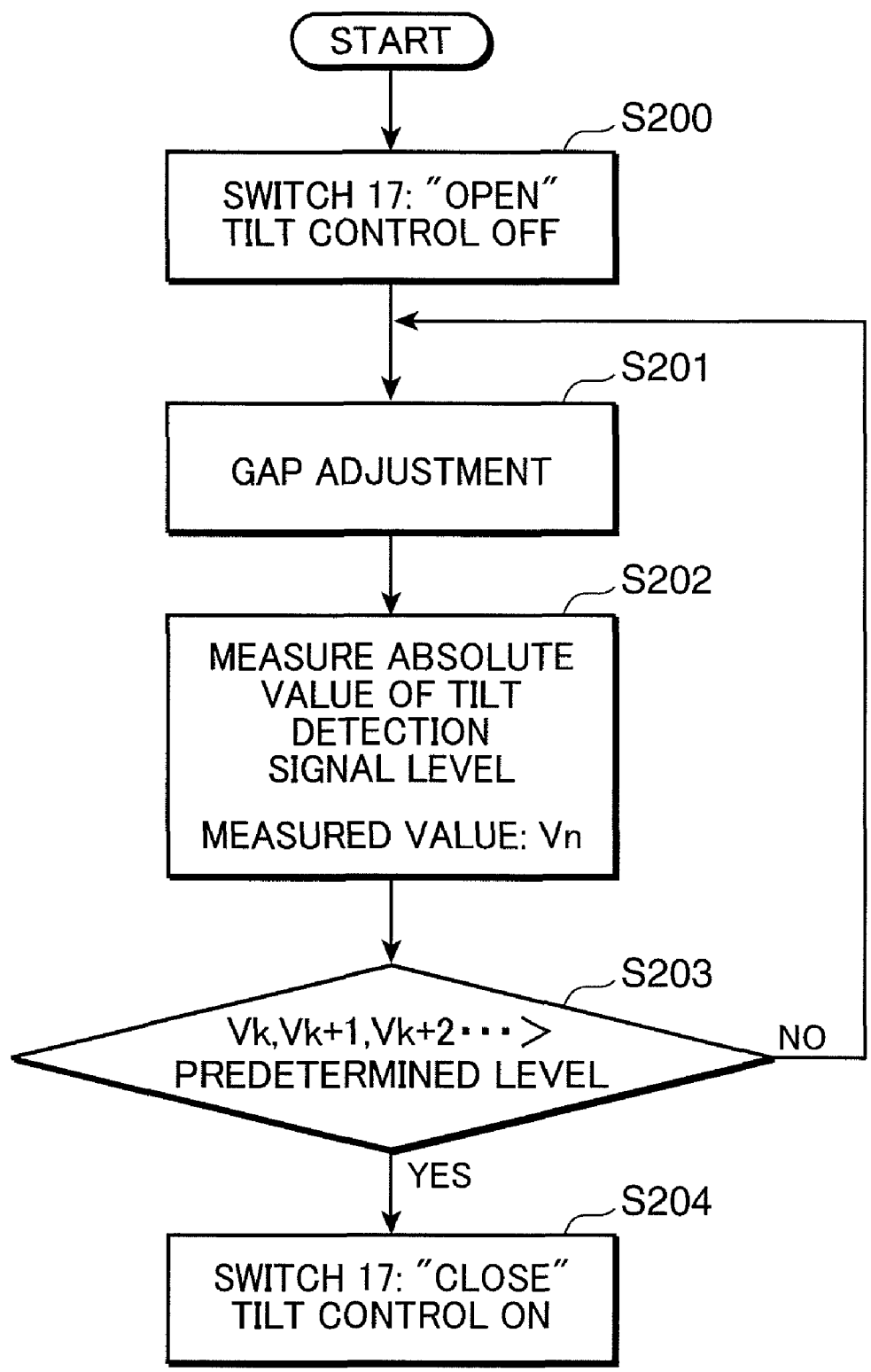
FIG. 13 is a flow chart depicting another tilt correction method in the optical disk device shown in FIG. 1.

In other words, as FIG. 13 shows, the tilt control OFF processing S200 for the CPU 21 shown in FIG. 1 to set the state of the switching instruction 22 of the switch 17 to "open" state is executed, just like step S100 shown in FIG. 12.

At this time, it is assumed that the values of the gap 9a and gap 9b generated by the relative tilt of SIL 4 and the optical disk 5 are sufficiently large, exceeding 500 nm.

Then just like step S101 in the method shown in FIG. 12, the gap adjustment processing S201 is executed in a direction that reduces the gap 9a and gap 9b, that is, the thus-explained gap adjustment unit constituted by nut 24, feed screw 25, decelerator 26 and stepping motor 27 is activated.

According to the method shown in FIG. 13 as well, the gap adjustment value for one time is 10 nm, just like the method in FIG. 12. Therefore a number of pulses of the rotation instruction pulse 23, that is a drive pulse to be supplied to the stepping motor 27 by the CPU 21, is a number corresponding to this 10 nm.

Then the absolute value level of the tilt detection signal 18 shown in FIG. 1 is measured, and the measurement processing S202, for storing the measured value Vn in the internal memory of the CPU 21 at a different address for each measurement, is executed. In concrete terms, in step S202, every time one gap adjustment processing ends, the subtracter 15 subtracts the photoelectric conversion signal 12b from the photoelectric conversion signal 12a, and outputs the result to the AD converter 19 as the tilt detection signal 18, the AD converter 19 converts the tilt detection signal 18 into the digitized tilt detection signal 20, and the CPU 21 sequentially stores the absolute value of the digitized tilt detection signal 20 in the internal memory as the measured value Vn.

Subscript n is an index that is incremented +1 at every measurement from the initial value 1, for example.

Then the processing S203 to evaluate the measured values Vk, Vk+1, Vk+2 . . . corresponding to a predetermined number of continuous subscripts n for the measured value Vn, against a predetermined level, is executed.

According to the study of the present inventors, the certainty of tilt detection becomes higher in the method in FIG. 13 compared to the method in FIG. 12 if the predetermined number of continuous subscripts n is 5, and in this case, an increase in processing time is within a tolerable range. The predetermined level is 0.05 to 0.1, just like the case of FIG. 12.

Therefore in the evaluation processing S203, the 5 measured values Vk, Vk+1, Vk+2, Vk+3 and Vk+4 are evaluated against the predetermined level, and if the result of evaluating Vk, Vk+1, Vk+2, Vk+3 and Vk+4>predetermined level is no, processing returns to the gap adjustment processing S201, and measurement processing S202 and evaluation processing S203 are repeated. If the result of evaluating Vk, Vk+1, Vk+2, Vk+3 and Vk+4>predetermined level is satisfactory, then the tilt control ON processing S204, to set the state of the switching instruction 22 of the switch 17 to "close", is executed, and a series of tilt corrections complete, that is the tilt of the SIL 4 with respect to the optical disk 5 is corrected.

In concrete terms regarding step S203, the CPU 21 compares each of the 5 measured values Vk, Vk+1, Vk+2, Vk+3 and Vk+4 stored in step S202 with the predetermined reference level Vref stored in the internal memory, and if all of the 5 measured values Vk, Vk+1, Vk+2, Vk+3 and Vk+4 are greater than the reference level Vref, processing advances to step S204, and if at least one of the 5 measured values Vk, Vk+1, Vk+2, Vk+3 and Vk+4 is not greater than the reference level Vref, processing returns to step S201 and subsequent processing is continued so that the SIL 4 moves closer to the optical disk 5 by 10 nm at a time.

If it is judged that all of the 5 measured values Vk, Vk+1, Vk+2, Vk+3 and Vk+4 are greater than the reference level Vref in step S203, then the CPU 21 switches the switching instruction 22 from the instruction to set the "open" state to the instruction to set the "close" state in step S204, whereby the switch 17 becomes "close" state, the tilt control is turned ON, and the actuator 13 corrects the tilt of the SIL 4 with respect to the optical disk 5.

Needless to say, the above mentioned processings S200 to S204 are all programmed in the CPU 21 in advance.

As described above, the method shown in FIG. 13 demands that the condition of the absolute value of the tilt detection signal level, exceeding a predetermined level, is continuously satisfied for a plurality of measurement times, therefore the tilt control is enabled in a state where tilt can be detected with an even higher certainty, and tilt correction of the SIL 4 and optical disk 5 can be performed more stably.

In other words, if the absolute value level of the tilt detection signal 18 is judged for only one measurement, a judgment error could occur due to the influence of noise, for example, and if a plurality of measurement times are performed at a same position, the absolute value level of the tilt detection signal 18 may not have a sufficient magnitude, and a judgment error may occur just the same, but if a plurality of measurements are performed while sequentially moving the SIL 4 closer to the optical disk 5 from a position at which the evaluation result is satisfactory, since the absolute value level of the tilt detection signal 18 sequentially has a greater magnitude, a measurement position at which the absolute value level of the tilt detection signal 18 is a sufficient magnitude can be easily selected, and the state of enabling the tilt control is judged with an even higher certainty.

In the above method, measurement is performed once each time the SIL 4 is moved closer to the optical disk 5, but the present invention is not limited to this example, and the measurement may be performed a plurality of times at a same location each time the SIL 4 is moved closer to the optical disk 5, so that the tilt control is enabled when all or a predetermined number of times or more of evaluation results are satisfactory for a predetermined number of continuous times.

In the present embodiment, the detector 11 has a two-division configuration, but the configuration of the detector is not limited to this example, and may be another division configuration. For example, if the detector 11 has a four-division configuration with correction axis directions of tilt correction that are a track direction and perpendicular direction (radial direction) of the optical disk 5, tilt correction of which correction axis is a tangential direction that is perpendicular to the radial direction can also be performed.

Figure 14:
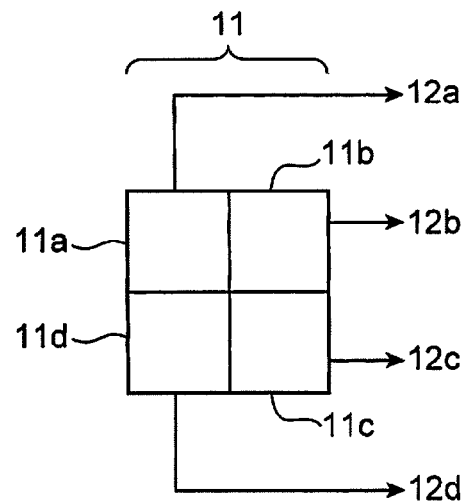
FIG. 14 is a diagram depicting a configuration of a four-division detector.
Figure 15:
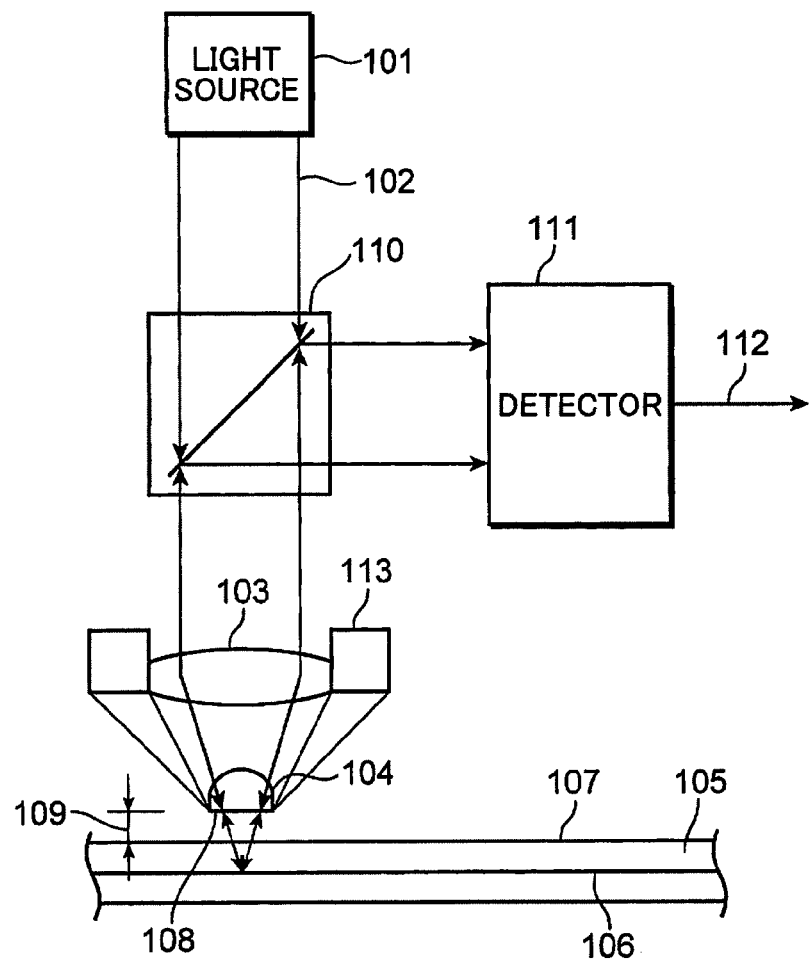
FIG. 15 is a diagram depicting a basic configuration of the optical system using SIL.

FIG. 14 shows a four-division configuration of the detector 11. As FIG. 14 shows, the detector 11 is divided in the vertical direction and horizontal direction, and if it is assumed that the divided portions of the detector 11 are the first to fourth detectors 11a, 11b, 11c and 11d respectively, the respective output signals are the photoelectric conversion signals 12a, 12b, 12c and 12d, and the levels of the photoelectric conversion signals are 12a, 12b, 12c and 12d, then a signal computed as (12a+12b)−(12c+12d) using the adder and subtracter corresponds to the tilt detection signal 18 in the radial direction when the detector 11 has a two-division configuration, and a signal computed as (12a+12d)−(12b+12c) becomes the tilt detection signal in the tangential direction.

Therefore if an independent amplifier/phase compensation circuit, switch and actuator are disposed corresponding to both correction axes, then an optical disk device, that implements tilt correction in the radial direction and tangential direction, can be implemented.

The tilt correction method using the detector 11 having a four-division configuration can be easily implemented by extending the method shown in FIG. 12 or FIG. 13.

In other words, the measurement processing S102 (or S202) and evaluation processing S103 (or S203) are executed independently for the correction axis for the radial direction and the correction axis for the tangential direction, and when the execution result of the evaluation processing S103 (or S203) is satisfactory in both cases, the tilt control ON processing S104 (S204) is executed independently for each correction axis.

As described above, a number of correction axes can be extended arbitrarily, and in order to dispose a desired number of correction axes, detectors having a corresponding division number, adder, subtracter, amplifier/phase compensation circuit, switch and actuator conforming to the output signals of the detector are independently disposed, and the tilt correction method in this case is extended in the same manner as the case of a detector having a four-division configuration.

As described above, according to the present embodiment, the tilt correction of the SIL 4 and optical disk 5 can be performed with certainty and stability, and the number of correction axes can be easily extended.

The present invention can be summarized as follows according to the above embodiments. An optical disk device of the present invention comprises an optical head that has a light source, and a condensing system including a solid immersion lens; a plurality of photoelectric conversion units that convert a reflected light from an information recording/reproducing surface formed on an optical disk and a reflected light of an incident light from the light source side of the solid immersion lens, into electric signals and output the signals; a tilt detection unit that outputs as tilt detection signals a result of computing output signals of each of the plurality of photoelectric conversion units according to a predetermined rule; a tilt control unit that performs tilt control for controlling the tilt of the solid immersion lens with respect to the optical disk, using the tilt detection signal from the tilt detection unit; and a gap adjustment unit that performs gap adjustment for changing the gap between the solid immersion lens and the optical disk, and the tilt control unit enables the tilt control according to the tilt detection signal that is output from the tilt detection unit in a process of adjusting a gap between the solid immersion lens and the optical disk by the gap adjustment unit.

In this optical disk device, the tilt control is enabled according to the tilt detection signal that is output from the tilt detection unit in the gap adjustment process between the solid immersion lens and the optical disk, so tilt of the solid immersion lens can be accurately corrected without the solid immersion lens colliding with the optical disk, even if the value required for the gap of the optical disk and solid immersion lens is extremely small.

It is preferable that the plurality of photoelectric conversion units include two photoelectric conversion units that convert the reflected light from the information recording/reproducing surface formed on the optical disk and the reflected light of the incident light from the light source side of the solid immersion lens into electric signals and output the signals, the tilt detection unit outputs a result of subtracting one of the output signals of the two photoelectric conversion units from the other one of the output signals as the tilt detection signal, and the gap adjustment unit moves the solid immersion lens closer to the optical disk in the gap adjustment process, and the tilt control unit enables the tilt control according to the tilt detection signal that is output from the tilt detection unit.

In this case, when the solid immersion lens is tilted with respect to the optical disk, the output signal of the photoelectric conversion unit, which converted the reflected light from the portion with a large gap between the optical disk and solid immersion lens, increases, and the output signal of the photoelectric conversion unit, which converted the reflected light from the portion with a small gap between the optical disk and solid immersion lens, decreases, so the tilt detection signal, which is a result of subtracting one of the output signals of the two photoelectric conversion units from the other output signal is in proportion to the relative tilt of the optical disk and the solid immersion lens. Even if the relative tilt of the optical disk and solid immersion lens is the same, the tilt detection signal increases as the solid immersion lens moves closer to the optical disk. Therefore by enabling the tilt control according to the tilt detection signal while moving the solid immersion lens closer to the optical disk, the tilt control can be enabled in a state where the relative tilt of the optical disk and solid immersion lens is detected with certainty, hence tilt can be accurately corrected.

It is preferable that the gap adjustment unit moves the solid immersion lens closer to the optical disk in the gap adjustment process, and the tilt control unit enables the tilt control when the absolute value of the tilt detection signal that is output from the tilt detection unit exceeds a predetermined level.

In this case, the absolute value of the tilt detection signal is in proportion to the relative tilt of the optical disk and solid immersion lens, and even if the relative tilt of the optical disk and solid immersion lens is the same, the absolute value of the tilt detection signal increases as the solid immersion lens moves closer to the optical disk, therefore by enabling the tilt control when the absolute value of the tilt detection signal exceeds a predetermined level while moving the solid immersion lens closer to the optical disk, the tilt control can be enabled in a state where the relative tilt of the optical disk and solid immersion lens is detected with a higher degree of certainty, hence the tilt can be more accurately corrected.

It is preferable that the gap adjustment unit sequentially moves the solid immersion lens closer to the optical disk in the gap adjustment process, and the tilt control unit enables the tilt control when the absolute value of the tilt detection signal that is output from the tilt detection unit exceeds a predetermined level continuously for a predetermined number of times.

In this case, it is judged whether the absolute value of the tilt detection signal exceeded a predetermined level continuously for a predetermined number of times, while sequentially moving the solid immersion lens closer to the optical disk from the position at which the absolute value of the tilt detection signal exceeded the predetermined level, so even if the relative tilt of the optical disk and solid immersion lens is the same, the absolute value level of the tilt detection signal sequentially increases at every judgment. Since the measurement position at which the absolute value level of the tilt detection signal reaches a sufficient magnitude can be easily selected, the state in which the tilt control is enabled can be determined with a higher degree of certainty.

It is preferable that the plurality of photoelectric conversion units include first to fourth photoelectric conversion units which convert the reflected light from the information recording/reproducing surface formed on the optical disk and the reflected light of the incident light from the light source side of the solid immersion lens into electric signals and output the signals, the tilt detection unit outputs, as a radial direction tilt detection signal, a result when an added value of the output signal of the third photoelectric conversion unit and the output signal of the fourth photoelectric conversion unit is subtracted from an added value of the output signal of the first photoelectric conversion unit and the output signal of the second photoelectric conversion unit, and outputs a result when an added value of the output signal of the second photoelectric conversion unit and the output signal of the third photoelectric conversion unit is subtracted from an added value of the output signal of the first photoelectric conversion unit and the output signal of the fourth photoelectric conversion unit, as a tangential direction tilt detection signal, and the gap adjustment unit moves the solid immersion lens closer to the optical disk in the gap adjustment process, and the tilt control unit enables the tilt control according to the radial direction tilt detection signal and the tangential direction tilt detection signal that are output from the tilt detection unit.

In this case, the tilt control is enabled according to the radial detection tilt detection signal and tangential direction tilt detection signal in the gap adjustment process of the solid immersion lens and optical disk, so the tilt of the solid immersion lens in the radial direction and tangential direction can be accurately corrected without the solid immersion lens colliding with the optical disk, even if the value required for the gap of the optical disk and solid immersion lens is extremely small.

It is preferable that the gap adjustment unit moves the solid immersion lens closer to the optical disk in the gap adjustment process, and the tilt control unit enables the tilt control when both the absolute value of the radial direction tilt detection signal and the absolute value of the tangential direction tilt detection signal that are output from the tilt detection unit exceed a predetermined level.

In this case, the absolute value of the radial direction tilt detection signal and the absolute value of the tangential direction tilt detection signal are in proportion to the relative tilt of the optical disk and the solid immersion lens, and even if the relative tilt of the optical disk and the solid immersion lens is the same, the absolute value of the radial direction tilt detection signal and the absolute value of the tangential direction tilt detection signal increase as the solid immersion lens moves closer to the optical disk, therefore by enabling the tilt control when both the absolute value of the radial direction tilt detection signal and the absolute value of the tangential direction tilt detection signal exceed the predetermined level while moving the solid immersion lens closer to the optical disk, the tilt control can be enabled in a state where the relative tilts of the optical disk and solid immersion lens in the radial direction and the tangential direction are detected with certainty, hence the tilts in the radial direction and the tangential direction can be more accurately corrected.

It is preferable that the gap adjustment unit sequentially moves the solid immersion lens closer to the optical disk in the gap adjustment process, and the tilt control unit enables the tilt control when both the absolute value of the radial direction tilt detection signal and the absolute value of the tangential direction tilt detection signal that are output from the tilt detection unit exceed a predetermined level continuously for a predetermined number of times.

In this case, it is judged whether both the absolute value of the radial direction tilt detection signal and the absolute value of the tangential direction tilt detection signal exceeded a predetermined value continuously for a predetermined number of times, while sequentially moving the solid immersion lens to the optical disk from the position at which both the absolute value of the radial direction tilt detection signal and the absolute value of the tangential direction tilt detection signal exceeded the predetermined level, so the absolute value level of the radial direction tilt detection signal and the absolute value level of the tangential direction tilt detection signal sequentially increases at every judgment. Since the measurement position, at which the absolute value level of the radial direction tilt detection signal and the absolute value level of the tangential direction tilt detection signal reach a sufficient magnitude, can be easily selected, the state in which the tilt control is enabled can be determined with a higher degree of certainty.

A tilt correction method of the present invention for an optical disk device having an optical head that has a light source, and a condensing system including a solid immersion lens, and a plurality of photoelectric conversion units that convert a reflected light from an information recording/reproducing surface formed on an optical disk and a reflected light of an incident light from the light source side of the solid immersion lens, into electric signals and output the signals, the method comprising: a first step of cancelling tilt control for controlling tilt of the solid immersion lens with respect to the optical disk; a second step of performing gap adjustment for decreasing a gap between the solid immersion lens and the optical disk with a predetermined interval; a third step of measuring a level of a tilt detection signal generated by computing respective output signals of the plurality of photoelectric conversion units according to a predetermined rule; a fourth step of judging propriety of the measurement result in the third step; and a fifth step of enabling the tilt control when the propriety judgment result in the fourth step is satisfactory.

In this tilt correction method for the optical disk device, the gap is adjusted so that the gap of the solid immersion lens and the optical disk is decreased with a predetermined interval, and the level of the tilt detection signal is measured in this gap adjustment step, and the tilt control is enabled when the measurement result is judged as satisfactory, so the tilt of the solid immersion lens can be accurately corrected without the solid immersion lens colliding with the optical disk, even if the value required for the gap of the optical disk and solid immersion lens is extremely small.

In the fifth step, it is preferable that the tilt control is enabled only when the propriety judgment result in the fourth step is satisfactory continuously for a predetermined number of times.

In this case, the tilt control is enabled only when the propriety judgment result is satisfactory continuously for a predetermined number of times, so the state in which the tilt control can be enabled can be judged with a higher degree of certainty.

In the fourth step, it is preferable that the measurement result in the third step is judged as satisfactory when the absolute value of the tilt detection signal exceeds a predetermined level.

In this case, the absolute value of the tilt detection signal is in proportion to the relative tilt of the optical disk and solid immersion lens, and even if the relative tilt of the optical disk and solid immersion lens is the same, the absolute value of the tilt detection signal increases as the solid immersion lens moves closer to the optical disk, therefore by enabling the tilt control when the absolute value of the tilt detection signal exceeds a predetermined level while moving the solid immersion lens closer to the optical disk, the tilt control can be enabled in a state where the relative tilt of the optical disk and solid immersion lens is detected with a higher degree of certainty, hence the tilt can be more accurately corrected.

INDUSTRIAL APPLICABILITY

The present invention is useful since the tilt can be accurately corrected in an optical disk device in which SIL is used for the condensing system, and can contribute to implementing a higher density of optical disks.

The invention claimed is:

1. An optical disk device, comprising:
an optical head that has a light source, and a condensing system including a solid immersion lens;
a plurality of photoelectric conversion units that convert a reflected light from an information recording/reproducing surface formed on an optical disk and a reflected light of an incident light from the light source side of the solid immersion lens, into electric signals and output the signals;
a tilt detection unit that outputs, as a tilt detection signal, a result of computing output signals of each of the plurality of photoelectric conversion units according to a predetermined rule;
a tilt control unit that performs tilt control for controlling the tilt of the solid immersion lens with respect to the optical disk, using the tilt detection signal from the tilt detection unit; and
a gap adjustment unit that performs gap adjustment for changing a gap between the solid immersion lens and the optical disk,
the tilt control unit enabling the tilt control according to the tilt detection signal that is output from the tilt detection unit in a process of adjusting the gap between the solid immersion lens and the optical disk by the gap adjustment unit, wherein:
the plurality of photoelectric conversion units include two photoelectric conversion units that convert the reflected light from the information recording/reproducing surface formed on the optical disk and the reflected light of the incident lights from the light source side of the solid immersion lens into electric signals and output the signals,
the tilt detection unit outputs a result of subtracting one of the output signals of the two photoelectric conversion units from the other one of the output signals as the tilt detection signal,
the gap adjustment unit moves the solid immersion lens closer to the optical disk in the gap adjustment process, and the tilt control unit enables the tilt control according to the tilt detection signal that is output from the tilt detection unit, and
the gap adjustment unit moves the solid immersion lens closer to the optical disk in the gap adjustment process, and the tilt control unit enables the tilt control when the absolute value of the tilt detection signal that is output from the tilt detection unit, exceeds a predetermined level.

2. An optical disk device, comprising:
an optical head that has a light source, and a condensing system including a solid immersion lens;
a plurality of photoelectric conversion units that convert a reflected light from an information recording/reproducing surface formed on an optical disk and a reflected light of an incident light from the light source side of the solid immersion lens, into electric signals and output the signals;
a tilt detection unit that outputs, as a tilt detection signal, a result of computing output signals of each of the plurality of photoelectric conversion units according to a predetermined rule;
a tilt control unit that performs tilt control for controlling the tilt of the solid immersion lens with respect to the optical disk, using the tilt detection signal from the tilt detection unit; and a gap adjustment unit that performs gap adjustment for changing a gap between the solid immersion lens and the optical disk, the tilt control unit enabling the tilt control according to the tilt detection signal that is output from the tilt detection unit in a process of adjusting the gap between the solid immersion lens and the optical disk by the gap adjustment unit, wherein:

the plurality of photoelectric conversion units include two photoelectric conversion units that convert the reflected light from the information recording/reproducing surface formed on the optical disk and the reflected light of the incident lights from the light source side of the solid immersion lens into electric signals and output the signals, the tilt detection unit outputs a result of subtracting one of the output signals of the two photoelectric conversion units from the other one of the output signals as the tilt detection signal, the gap adjustment unit moves the solid immersion lens closer to the optical disk in the gap adjustment process, and the tilt control unit enables the tilt control according to the tilt detection signal that is output from the tilt detection unit, and the gap adjustment unit sequentially moves the solid immersion lens closer to the optical disk in the gap adjustment process, and the tilt control unit enables the tilt control when the absolute value of the tilt detection signal that is output from the tilt detection unit exceeds a predetermined level continuously for a predetermined number of times.

3. The optical disk device according to claim 1, wherein the plurality of photoelectric conversion units include first to fourth photoelectric conversion units which convert the reflected light from the information recording/reproducing surface formed on the optical disk and the reflected light of the incident light from the light source side of the solid immersion lens into electric signals and output the signals, the tilt detection unit outputs, as a radial direction tilt detection signal, a result when an added value of the output signal of the third photoelectric conversion unit and the output signal of the fourth photoelectric conversion unit is subtracted from an added value of the output signal of the first photoelectric conversion unit and the output signal of the second photoelectric conversion unit, and outputs, as a tangential direction tilt detection signal, a result when an added value of the output signal of the second photoelectric conversion unit and the output signal of the third photoelectric conversion unit is subtracted from an added value of the output signal of the first photoelectric conversion unit and the output signal of the fourth photoelectric conversion unit, and the gap adjustment unit moves the solid immersion lens closer to the optical disk in the gap adjustment process, and the tilt control unit enables the tilt control according to the radial direction tilt detection signal and the tangential direction tilt detection signal that are output from the tilt detection unit.

4. The optical disk device according to claim 3, wherein the gap adjustment unit moves the solid immersion lens closer to the optical disk in the gap adjustment process, and the tilt control unit enables the tilt control when both the absolute value of the radial direction tilt detection signal and the absolute value of the tangential direction tilt detection signal that are output from the tilt detection unit exceed a predetermined level.

5. The optical disk device according to claim 3, wherein the gap adjustment unit sequentially moves the solid immersion lens closer to the optical disk in the gap adjustment process, and the tilt control unit enables the tilt control when both the absolute value of the radial direction tilt detection signal and the absolute value of the tangential direction tilt detection signal that are output from the tilt detection unit exceed a predetermined level continuously for a predetermined number of times.

6. A tilt correction method for an optical disk device having an optical head that has a light source and a condensing system including a solid immersion lens, and a plurality of photoelectric conversion units that convert a reflected light from an information recording/reproducing surface formed on an optical disk and a reflected light of an incident light from the light source side of the solid immersion lens, into electric signals and output the signals, the method comprising:

a first step of cancelling tilt control for controlling tilt of the solid immersion lens with respect to the optical disk;

a second step of performing gap adjustment for decreasing a gap between the solid immersion lens and the optical disk with a predetermined interval;

a third step of measuring a level of a tilt detection signal generated by computing respective output signals of the plurality of photoelectric conversion units according to a predetermined rule;

a fourth step of judging propriety of the measurement result in the third step; and a fifth step of enabling the tilt control when the propriety judgment result in the fourth step is satisfactory, wherein in the fourth step, the measurement result in the third step is judged as satisfactory when the absolute value of the tilt detection signal exceeds a predetermined level.

7. The tilt correction method for an optical disk device according to claim 6, wherein in the fifth step, the tilt control is enabled only when the propriety judgment result in the fourth step is satisfactory continuously for a predetermined number of times.

* * * * *